A. W. DOWE.
WAVE MOTOR.
APPLICATION FILED FEB. 18, 1911.
1,003,241.
Patented Sept. 12, 1911.
2 SHEETS—SHEET 1.
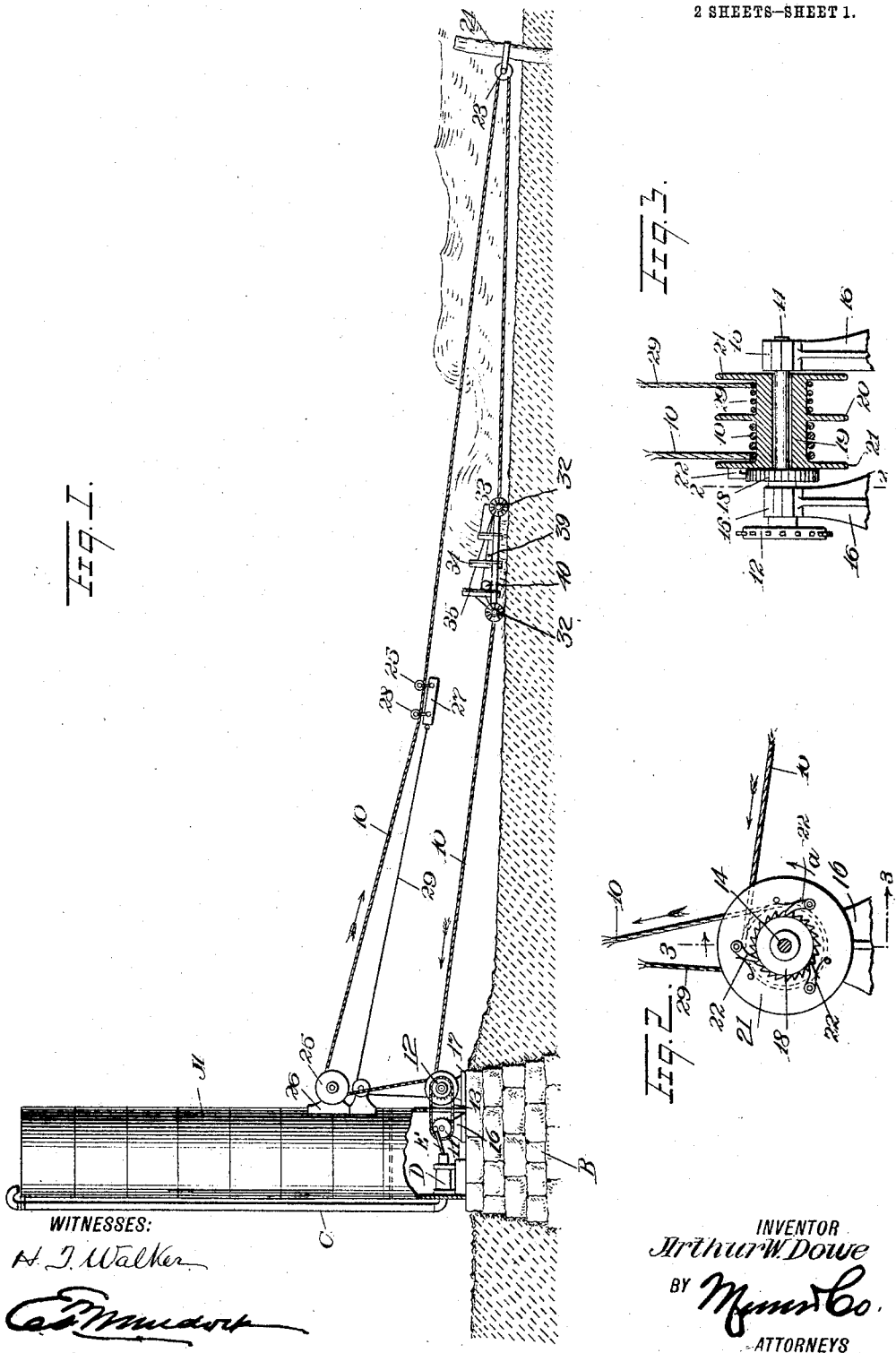
INVENTOR
Arthur W. Dowe
BY Myers & Co.
ATTORNEYS

A. W. DOWE.
WAVE MOTOR.
APPLICATION FILED FEB. 18, 1911.

1,003,241.

Patented Sept. 12, 1911.
2 SHEETS—SHEET 2.

WITNESSES:
H. J. Walker

INVENTOR
Arthur W. Dowe
BY
ATTORNEYS

UNITED STATES PATENT OFFICE.

ARTHUR W. DOWE, OF CAMDEN, NEW JERSEY.

WAVE-MOTOR.

1,003,241.

Specification of Letters Patent. Patented Sept. 12, 1911.

Application filed February 18, 1911. Serial No. 609,289.

*To all whom it may concern:*

Be it known that I, ARTHUR W. DOWE, a citizen of the United States, and a resident of Camden, in the county of Camden and State of New Jersey, have invented a new and Improved Wave-Motor, of which the following is a full, clear, and exact description.

Among the principal objects which the present invention has in view are: to provide a machine of the character mentioned constructed and arranged to avoid the destructive operation of the elements incidental to storms; to provide a construction which receives and transmits the full dynamic power of the surf or waves at the shore line; and to provide a machine of the character named, the power or full efficiency of which may be augmented to a large degree by multiplying the motor units indefinitely.

One embodiment of the present invention is disclosed in the structure illustrated in the accompanying drawings, in which like characters of reference denote corresponding parts in all the views, and in which—

Figure 4:
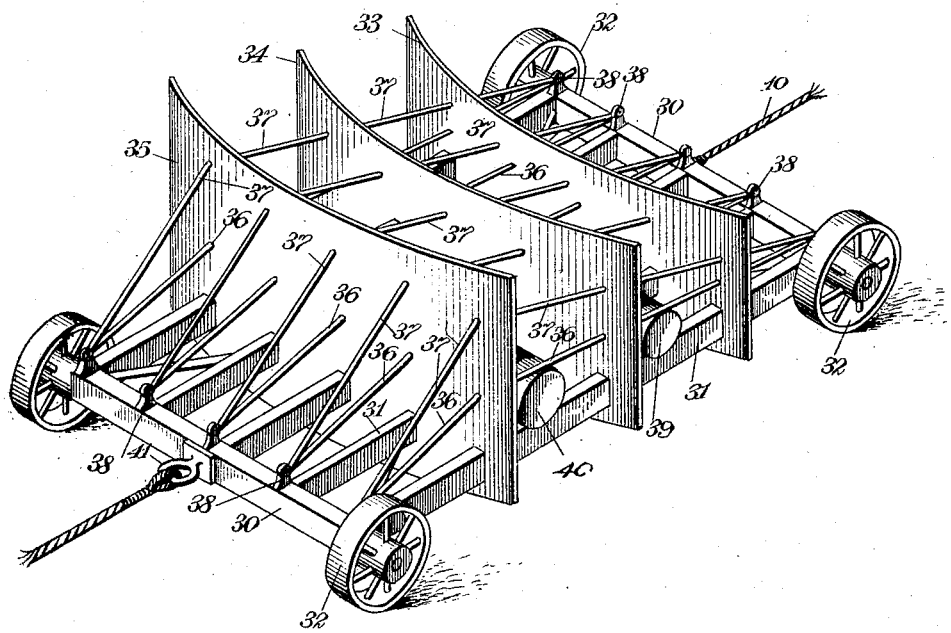
Figure 5:
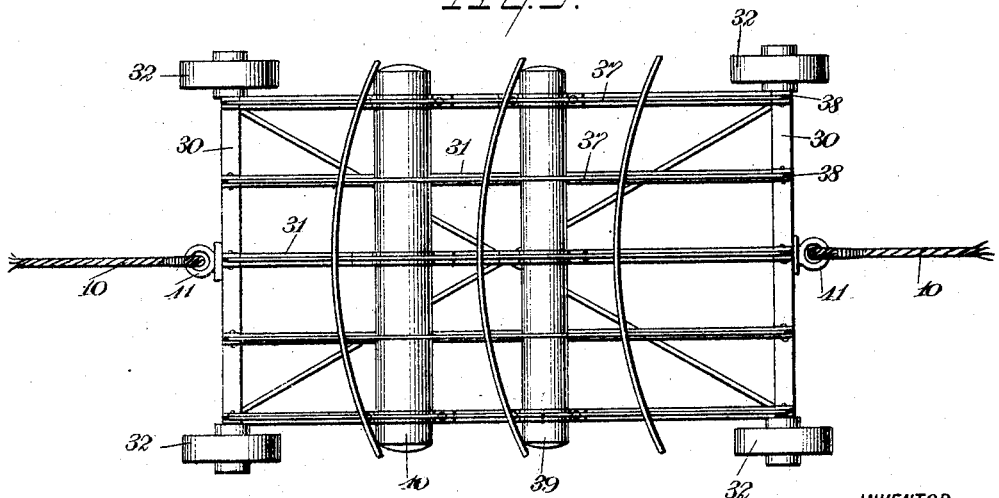

Figure 1 is a pictorial view of a water tank located upon the shore of the ocean and removed from the high water line thereof, provided with a pumping mechanism for raising water into said tank, said mechnism being constructed and arranged in accordance with the present invention; Fig. 2 is a detail view, on an enlarged scale, of the driving shaft and a rotary drum connected operatively therewith; Fig. 3 is a vertical section taken on the line 3—3 in Fig. 2; Fig. 4 is a perspective view of a drag car forming the prime mover of the driving mechanism; and Fig. 5 is a plan view of the above mentioned car.

It will be understood that the mechanism herein shown and described may be adapted for many purposes, among which may be mentioned the generation of electricity for storage or direct use. In the present disclosure the adaptation of the mechanism to the storage of water in elevated tanks is selected.

The tank A is of any suitable construction, mounted on a foundation B suitably removed from the surf line of the shore on which the tank is erected. The distance at which the tank A is removed from the water line is optional, the one limitation being that of convenience and cost of carriage for the operating cable 10. The tank is provided with a stand pipe C extended to deliver the water from a pump D into the top of the tank A. The pump in the present instance is a reciprocating pump, being connected by means of a pitman E with the crank wheel 11 of the present driving mechanism. The application of the water as power thus stored in the tank A, or in any multiplication of tanks, is optional. The power thus stored may be utilized for running lighting plants or for operating hydraulic motors and machinery connected therewith.

The crank wheel 11 may be substituted for any other convenient form of transmission device. In the present instance the said wheel is connected with a sprocket wheel 12 by means of a sprocket chain 13. The sprocket wheel 12 is fixedly mounted on a driving shaft 14. The shaft 14 is suitably mounted in bearing boxes 15 formed in the head of standards 16. The standards 16 are suitably mounted on a base plate 17, which, as shown in the drawings, is secured rigidly to a proper foundation. Fixedly mounted on the shaft 14 to rotate the same is a ratchet wheel 18.

Loosely mounted on the driving shaft 14 is a drum 19, preferably divided by means of a fin 20 into two winding or spool sections. At the extremes of the drum 20 are formed the head flanges 21. On the flange 21 adjacent the wheel 18 is pivotally mounted a series of pawls 22. The pawls 22 are so arranged that one of the said pawls is engaged with a tooth of the ratchet wheel in all positions of the drum and wheel. This construction is usual and is adapted for the purpose of avoiding the shock incident to a quick rotation of the drum into engaged relation with the ratchet wheel.

One of the spool sections of the drum 19 is devoted to winding the cable 10. The cable 10 is reeved about a pulley 23 suitably secured at a point in the water below the low water mark and preferably beyond the wash of the surf on the shore of the ocean. In the present instance the anchorage is shown as a pile 24. It will be understood, however, that there may be substituted for the pile 24 any suitable form of anchorage, such as a drag or mud hook anchor, which would be carried beyond the pulley 23 to be secured thereto by means of suitable cable connection. For the purpose of the present invention all that is required is that the pulley 23 should be suitably anchored at a point beyond the beach and travel of the car which constitutes the prime mover in the present mechanism.

The upper strand of the cable 10 is reeved over a sheave 25. The sheave 25 is suitably mounted on a fixed structure, in the present instance shown as the tank A, being secured thereto by means of a bracket bearing 26. The raised position of the sheave 25 is thus provided to produce the necessary fall for the upper strand of the cable 10. The said cable 10, in this position, is utilized as an incline down which the heavy weight 27 is carried by means of the wheels 28 upon which the said weight is suspended. The purpose of the weight 27 and the method of mounting the same is to form an automatic rewinding device for the drum 19, and, further, to provide a takeup member to sustain the first shock of the weight delivered on the prime mover carriage hereinafter described, and thus relieve, by checking the sudden movement of the drum 19, the pound or ram on the pump D or other machine connected with the drum 19.

For the above purpose the weight 27 is connected by means of an auxiliary line 29 with the drum 19, which line is wound in the second spool section formed on the said drum. This line is unwound from the drum 19 in one direction only, and that opposite to the pull of the upper stretch of the cable 10, thus serving to rewind the said drum when the cable 10 is relieved from the pull of the prime mover carriage.

The prime mover carriage is shown best in Figs. 4 and 5 of the drawings. It consists primarily in a rectangular rigid frame the cross members 30 of which are heavily reinforced by longitudinal framing members 31. Axle bearings for wheels 32 are formed on the ends of the cross members 30. The framing members 31 are provided to support the buttress plates 33, 34 and 35. The plates 33, 34 and 35 are increased in height in the order named, as shown best in Fig. 4 of the drawings. In this manner any wash or drive over the upper edge of the first of said plates is caught by the second, and any wash over the top of the second plate is caught by the third. Further, by the arrangement where the lesser area is first presented to the full force of the blow of the waves to be succeeded by a member of increased area, which in turn is again succeeded by a member of further increased area, results in a gradual rather than a sudden pull on the cable 10 and the pulley 23.

The plates 33, 34 and 35 are reinforced or braced in vertical position substantially as shown in Fig. 4 of the drawings by truss rods 36 and 37. The truss rods 36 and 37 are disposed substantially as shown in Fig. 4, and are both connected to anchor blocks 38 mounted on the members 30. This construction, it will be observed, provides a rolling vehicle adapted to roll or slide over the beach, and which is provided with impact members or buttress plates constructed with a view to the greatest rigidity or shock resisting quality. Disposed between the plates 33 and 34 and 34 and 35 are air tanks 39 and 40. The tanks 39 and 40 are provided for the flotation of the prime mover. The flotation thus provided relieves the wheels 32 from the weight of the carriage and facilitates the movement thereof.

It will be understood that during danger periods, such as a storm, the drum 19 is manually manipulated to wind the cable 10 until the prime mover or carriage mounted on the wheels 32 is drawn out of the water and above the high water mark thereof. The ends of the cable 10 are secured to the cross members 30 by means of eyelets 41.

In the usual operation of the wave motor thus constructed and arranged the prime mover carriage is disposed to roll back and forth on the shelf of the beach within the surf line thereof, thus receiving the added force of the forward thrusting or falling water of the surf as well as the surge of the waves. With each impact thus received the carriage is driven up the incline of the beach, and draws the outer extension of the cable 10 around the pulley 23 over the sheave 25 to rotate the drum 19 in the direction shown by the arrow $a$ in Fig. 2 of the drawings. In this rotation of the drum 19 it will be seen by reference to Fig. 2 of the drawings that the pawls 22 engage the teeth on the ratchet wheel 18 and rotate the shaft 14 and sprocket wheel 12 connected therewith. The rotation of the sprocket wheel 12 rotates the crank wheel 11 to reciprocate the pitman E and the plunger of the pump connected therewith.

The rotation of the drum 19 in the direction above described winds the line 29 on the said drum and draws the weight 27 up the incline of the upper reach on the cable 10. When now the wave force is removed from the prime mover, and the plates 33, 34 and 35 thereof, the weight 27 moves down the incline of the cable 10, drawing upon the line 29 to rewind the same and to reverse the rotation of the drum 19. The pull on the cable 10 resultant on the reverse rotation of the drum 19, winds the upper extension of the cable 10 and pulls on the outer extension thereof from the pulley 23, thereby drawing the carriage or prime mover outward into the surf of the ocean.

Thus it will be seen that by the continuous action of the waves driving the prime mover up the beach, and the weight 27 returning the prime mover into the surf, the consequent rotation of the drum 19 in successive reverse directions, and the transmission from the drum by means of the pawl and ratchet connection with the shaft 14 of a constant rotary direction to the said shaft 14, imparts through the sprocket wheel 12 an intermittent operation of the pump D which lifts at each stroke a certain quantity of water to the top of the tank A.

Having thus described my invention, what I claim as new and desire to secure by Letters Patent is:—

1. A wave motor, comprising a rotary drum mounted adjacent the shore line of a body of water; an operating cable wound upon said drum; an anchorage for said cable disposed within said body of water and upon the shore line thereof; a guide for said cable raised above said drum to form an inclined runway to the said anchorage; a drag operatively connected with said cable disposed to travel back and forth toward said drum and said anchorage within said body of water at the shore line thereof; a weight member carried by said cable to move said drag toward said anchorage; and a rewinding line operatively connected with said weight member and wound upon said drum.

2. A wave motor, having an endless cable drive; a wheel supported carriage operatively connected with said cable; and a plurality of buttress plates vertically disposed on said carriage to receive the impact of the waves.

3. A wave motor, having an endless cable drive; a wheel supported carriage operatively connected with said cable; and a series of buttress plates vertically disposed on said carriage, the members of said series being gradually increased in height toward the rear of said carriage.

4. A wave motor, having an endless cable drive; a wheel supported carriage operatively connected with said cable; a series of buttress plates vertically disposed on said carriage, the members of said series being gradually increased in height toward the rear of said carriage; and reinforcing truss rods for said plates adapted to maintain the vertical position of said plates on said carriage.

In testimony whereof I have signed my name to this specification in the presence of two subscribing witnesses.

ARTHUR W. DOWE.

Witnesses:
  JAMES T. MAGEE,
  MABEL M. DUFFEE.